(12) United States Patent
Knaub et al.

(10) Patent No.: US 12,534,128 B2
(45) Date of Patent: Jan. 27, 2026

(54) SYSTEMS AND METHODS FOR REVERSE DIRECTIONAL POLARITY STEERING

(71) Applicant: STEERING SOLUTIONS IP HOLDING CORPORATION, Saginaw, MI (US)

(72) Inventors: Scott T. Knaub, Bay City, MI (US); Nicholas M. Trewhella, Sanford, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 201 days.

(21) Appl. No.: 18/202,647

(22) Filed: May 26, 2023

(65) Prior Publication Data

US 2023/0382451 A1 Nov. 30, 2023

Related U.S. Application Data

(60) Provisional application No. 63/346,436, filed on May 27, 2022.

(51) Int. Cl.
*B62D 13/06* (2006.01)
*B62D 15/02* (2006.01)

(52) U.S. Cl.
CPC ............ *B62D 13/06* (2013.01); *B62D 15/027* (2013.01)

(58) Field of Classification Search
CPC .............................. B62D 13/06; B62D 15/027
See application file for complete search history.

(56) References Cited

U.S. PATENT DOCUMENTS

| | | | |
|---|---|---|---|
| 7,676,310 B2 * | 3/2010 | Klein | B62D 15/0285 |
| | | | 701/41 |
| 11,179,981 B2 * | 11/2021 | Shank | G06T 5/70 |
| 2020/0017137 A1 * | 1/2020 | Otto | B62D 5/001 |
| 2020/0148256 A1 * | 5/2020 | Brimmer | B62D 15/025 |
| 2025/0145159 A1 * | 5/2025 | Wei | B62D 15/025 |

* cited by examiner

*Primary Examiner* — Mark L. Greene
(74) *Attorney, Agent, or Firm* — Dickinson Wright PLLC (57) ABSTRACT

A method for providing reverse directional polarity steering in a vehicle includes, in response to receiving a reverse position polarity steering mode signal indicating selection of a reverse position polarity steering mode: determining a selected gear of a transmission of the vehicle; determining a vehicle speed; and, in response to a determination that the selected gear includes a reverse gear and the vehicle speed is within a range of a predetermined vehicle speed, selectively controlling at least one roadwheel actuator of the vehicle in a direction opposite to a direction indicated by a handwheel actuator associated with a handwheel of the vehicle.

20 Claims, 5 Drawing Sheets

SYSTEMS AND METHODS FOR REVERSE DIRECTIONAL POLARITY STEERING

CROSS-REFERENCE TO RELATED APPLICATION

The present disclosure claims priority to U.S. Provisional Patent Application Ser. No. 63/346,436, filed May 27, 2022 which is incorporated herein by reference in its entirety.

TECHNICAL FIELD

This disclosure relates to vehicle steering. And in particular to systems and methods for providing reverse directional polarity steering.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for providing reverse directional polarity steering in a vehicle. The method includes, in response to receiving a reverse position polarity steering mode signal indicating selection of a reverse position polarity steering mode: determining a selected gear of a transmission of the vehicle; determining a vehicle speed; and, in response to a determination that the selected gear includes a reverse gear and the vehicle speed is within a range of a predetermined vehicle speed, selectively controlling at least one roadwheel actuator of the vehicle in a direction opposite to a direction indicated by a handwheel actuator associated with a handwheel of the vehicle.

Another aspect of the disclosed embodiments includes a system for providing reverse directional polarity steering in a vehicle. The system includes a processor and a memory. The memory includes instructions that, when executed by the processor, cause the processor to, in response to receiving a reverse position polarity steering mode signal indicating selection of a reverse position polarity steering mode: determine a selected gear of a transmission of the vehicle; determine a vehicle speed; and, in response to a determination that the selected gear includes a reverse gear and the vehicle speed is within a range of a predetermined vehicle speed, selectively control at least one roadwheel actuator of the vehicle in a direction opposite to a direction indicated by a handwheel actuator associated with a handwheel of the vehicle.

Another aspect of the disclosed embodiments includes an apparatus for providing reverse directional polarity steering in a vehicle. The apparatus includes a processor and a memory. The memory includes instructions that, when executed by the processor, cause the a processor to: in response to receiving a reverse position polarity steering mode signal indicating selection of a reverse position polarity steering mode: determine a selected gear of a transmission of the vehicle; determine a vehicle speed; in response to a determination that the selected gear includes a reverse gear and the vehicle speed is within a range of a predetermined vehicle speed, selectively control at least one roadwheel actuator of the vehicle in a direction opposite to a direction indicated by a handwheel actuator associated with a handwheel of the vehicle; in response to a determination that the selected gear is not the reverse gear: disengage the reverse position polarity steering mode; and selectively control the at least one roadwheel actuator of the vehicle in a direction corresponding to the direction indicated by the handwheel actuator associated with the handwheel of the vehicle; and, in response to a determination that the vehicle speed is outside of the range of the predetermined vehicle speed: disengage the reverse position polarity steering mode; and selectively control the at least one roadwheel actuator of the vehicle in a direction corresponding to the direction indicated by the handwheel actuator associated with the handwheel of the vehicle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

Typically, such systems are relied on by various aspects of the vehicle to perform steering maneuvers, such as reverse steering maneuvers while the vehicle is towing a payload, such as a trailer or other suitable payload. Many vehicle operators who infrequently tow a payload, such as a trailer, find it difficult to transition to the reverse mindset for backing up the trailer due to the pivot point at a hitch connection with the vehicle. Typically, systems that assist in trailer backup utilized in EPS require the hands of the operator to be removed from a handwheel of the vehicle to allow the handwheel to rotate while directional control is provided through use of a dial or other secondary device (e.g., a relatively small secondary input device or multiple devices). To limit the space used in a cabin of the vehicle, the secondary input device or devices are typically small resulting in poor resolution when commanding the input. Additionally, such devices may not provide direct tactile feedback to the operator.

Accordingly, systems and methods, such as those described herein, configured to provide reverse position polarity steering, while allowing the hands of the operator to remain on the handwheel, may be desirable. In some embodiments, the systems and methods described herein may be configured to use a SbW steering system of the vehicle. The SbW may omit an intermediate shaft connecting the handwheel to roadwheels of the vehicle, which may allow for additional degrees of freedom and may decouple a bound direction of the handwheel to that of the roadwheels. The systems and methods described herein may be configured to reverse a roadwheel direction in relation to a conventional handwheel rotation, while allowing the operator to maintain hands on the handwheel. The systems and methods described herein may be configured to provide, via the handwheel, improved control and input resolution (e.g., relative to that of a relatively small dial).

The systems and methods described herein may be configured to allow the operator to fully utilize rear view and side mirrors as well as one or more back up cameras, if the vehicle is so equipped. The systems and methods described herein may be configured to assist in trailer back up scenarios, which can provide additional input (e.g., visual, audible tactile, and/or the like) to the operator.

In some embodiments, the systems and methods described herein may be configured to allow an unfamiliar operator (e.g., an operator who has little to no experience towing and, in particular, controlling the payload while in reverse) to maintain hands on the handwheel of the vehicle while facing forward and using the natural point to target wheel direction control.

The systems and methods described herein may be configured to, in response to an indication (e.g., such as a signal from a mode switch or other suitable indication) that the reverse position polarity mode is selected, engage the reverse position polarity steering mode if the vehicle speed is within a calibratable vehicle speed threshold, the vehicle is in a reverse gear, and/or a measured handwheel torque is within a calibratable torque level. The systems and methods described herein may be configured to, when the reverse position polarity steering mode is engaged, switch the directional polarity of the position reference for at least one roadwheel actuator of the vehicle.

The systems and methods described herein may be configured to provide polarity reversal of the roadwheel actuator directional reference, which may move the wheels of the vehicle in the opposite direction of the wheels of the vehicle during standard drive mode engagement, while not modifying the rack load estimation.

The systems and methods described herein may be configured to engage the reverse position polarity steering mode while the vehicle is in reverse, and operating at a vehicle speed that is less than a calibratable vehicle speed threshold. The systems and methods described herein may be configured to, when the vehicle is either not in reverse or the vehicle speed is not less than the calibratable vehicle speed threshold, revert back to standard polarity through a controlled operation or operations of the roadwheel position to match the handwheel position.

Figure 3:
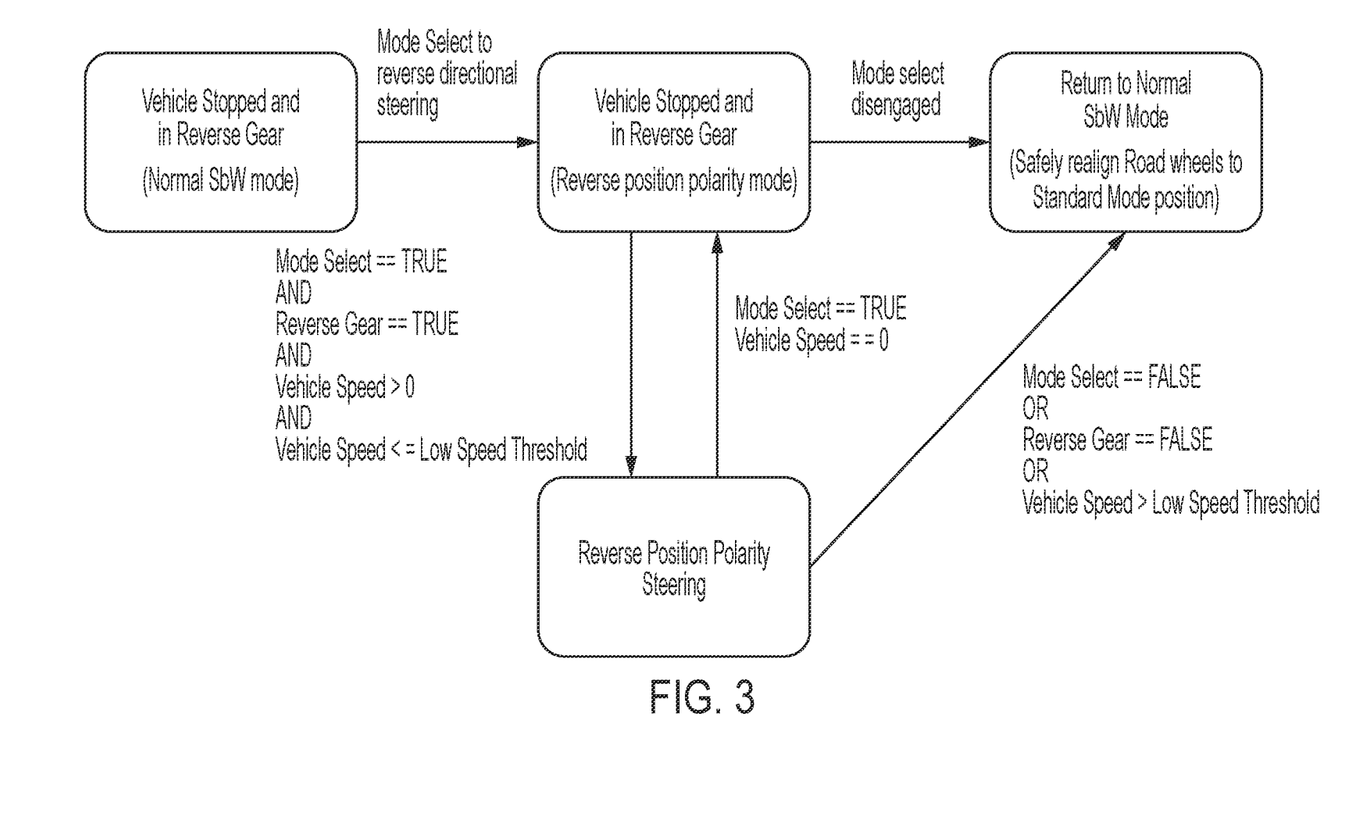
FIG. 3 generally illustrate a block diagram of various states of a reverse position polarity steering mode according to the principles of the present disclosure.

As is generally illustrated in FIG. 3, when the vehicle is operating in a standard steering mode (e.g., which may include a steering mode where the wheels of the vehicle turn in a direction corresponding to the direction of the handwheel), if the systems and methods described herein receive a signal to engage the reverse position polarity steering mode, the systems and methods described herein may be configured to, in response to the vehicle is in the reverse gear and the vehicle speed is greater than 0 and less than or equal to a low speed threshold, engage the reverse position polarity steering mode. The systems and methods described herein may be configured to, in response to the vehicle speed exceeding the low speed threshold and/or the vehicle being in a gear other that the reverse gear, disengage the reverse position polarity steering mode. The systems and methods described herein may be configured to engage the standard steering mode.

In some embodiments, the systems and methods described herein may be configured to using a SbW steering system, which may omit the intermediate shaft, which may allow for an improved steering mode functionality and which may safely allow the operator to maintain control of the handwheel. The systems and methods described herein may be configured to invert the direction of the roadwheel travel.

The systems and methods described herein may be configured to allow the operator to maintain control through the handwheel, which may provide improved (e.g., greater) resolution of input movement (e.g., relative to the secondary input devices of typical systems). The systems and methods described herein may be configured to eliminate, while providing tactile feedback to the operator, the need to remove the hands of the operator from the handwheel while the vehicle is in motion.

In some embodiments, the systems and methods described herein may be configured to, receive a reverse position polarity steering mode signal indicating selection of a reverse position polarity steering mode. The systems and methods described herein may be configured to determine a selected gear of a transmission of the vehicle. The systems and methods described herein may be configured to determine a vehicle speed of the vehicle. The systems and methods described herein may be configured to, in response to a determination that the selected gear includes a reverse gear and the vehicle speed is within a range of a predetermined vehicle speed (e.g., such as a vehicle speed indicating that the vehicle is stopped or other suitable vehicle speed), selectively control at least one roadwheel actuator of the vehicle in a direction opposite to a direction indicated by a handwheel actuator associated with a handwheel of the vehicle. The handwheel actuator and the roadwheel actuator may correspond to a steering system of the vehicle (e.g., such as a SbW steering system or other suitable steering system of the vehicle).

The systems and methods described herein may be configured to, in response to a determination that the selected gear is not the reverse gear, disengage the reverse position polarity steering mode and selectively control the at least one roadwheel actuator in a direction corresponding to the direction indicated by the handwheel actuator. The systems and methods described herein may be configured to, in response to a determination that the vehicle speed is outside of the range of the predetermined vehicle speed, disengage the reverse position polarity steering mode and selectively control the at least one roadwheel actuator in a direction corresponding to the direction indicated by the handwheel actuator.

Figure 1:
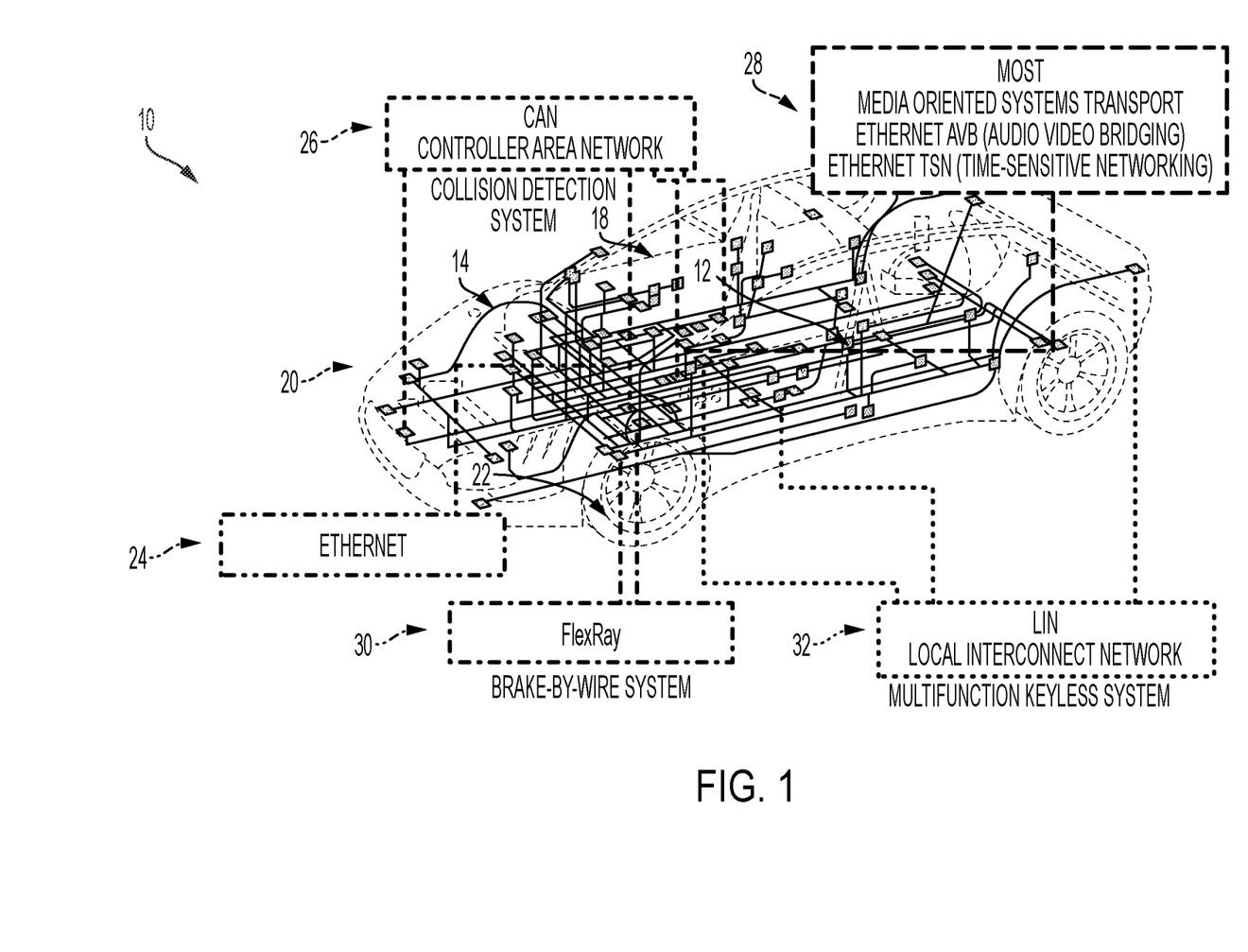
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
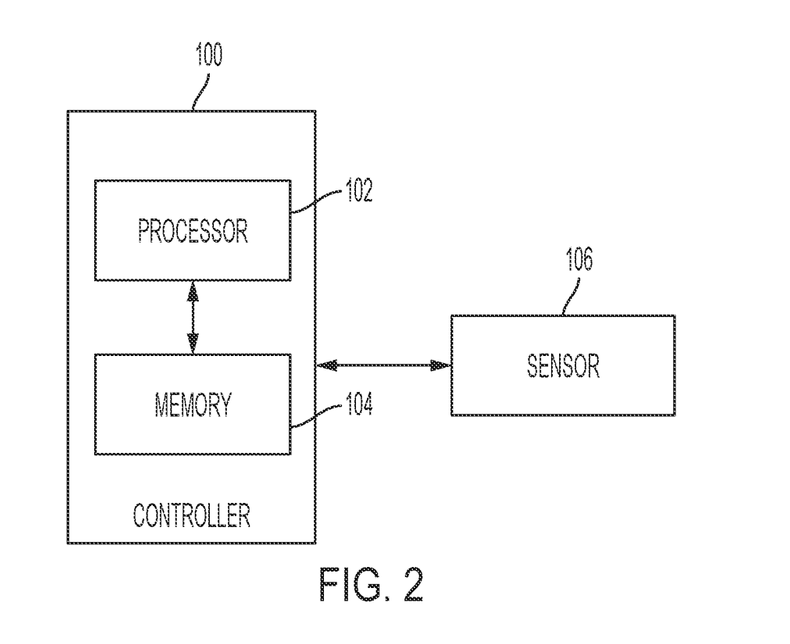
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

Figure 4A:
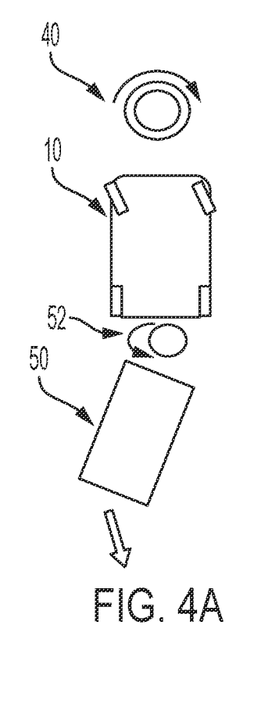
FIGS. 4A-4C generally illustrate a vehicle towing a trailer according to the principles of the present disclosure.
Figure 4B:
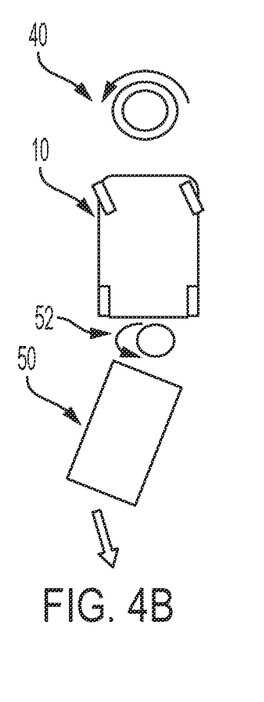
Figure 4C:
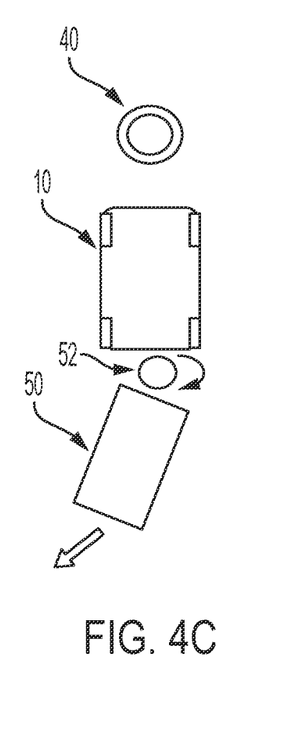

In some embodiments, the controller 100, as is generally illustrated in FIGS. 4A-4C, may be configured to engage a reverse position polarity steering mode of the steering system (e.g., such as a SbW steering system) of the vehicle 10 while the vehicle 10 is towing a payload 50 (e.g., such as a trailer or other suitable payload). For example, the controller 100 may receive a reverse position polarity steering mode signal indicating selection of a reverse position polarity steering mode. The controller 100 may determine a selected gear of a transmission of the vehicle 10. The controller 100 may determine a vehicle speed of the vehicle 10.

The controller 100 may reverse motion inducing a moment at the hitch pivot point 52 between the vehicle 10 and the payload 50. For example, the controller 100 may, correct direction of travel to the right, steer the wheels of the vehicle 10 to the left (e.g., allowing the operator to continue to steer in a direction that has the handwheel 40 input matching the desired direction of travel, as is generally illustrated in FIG. 4A).

In some embodiments, the controller 100 may, in response to a determination that the selected gear includes a reverse gear and the vehicle speed is within a range of a predetermined vehicle speed (e.g., such as a vehicle speed indicating that the vehicle 10 is stopped or other suitable vehicle speed), selectively control at least one roadwheel actuator of the vehicle 10 in a direction opposite to a direction indicated by a handwheel actuator associated with a handwheel 40 of the vehicle 10. The controller 100 may, in response to a determination that the selected gear is not the reverse gear, disengage the reverse position polarity steering mode and selectively control the at least one roadwheel actuator in a direction corresponding to the direction indicated by the handwheel actuator, as is generally illustrated in FIG. 4B. The controller 100 may, in response to a determination that the vehicle speed is outside of the range of the predetermined vehicle speed, disengage the reverse position polarity steering mode and selectively control the at least one roadwheel actuator in a direction corresponding to the direction indicated by the handwheel actuator, as is generally illustrated in FIG. 4C.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
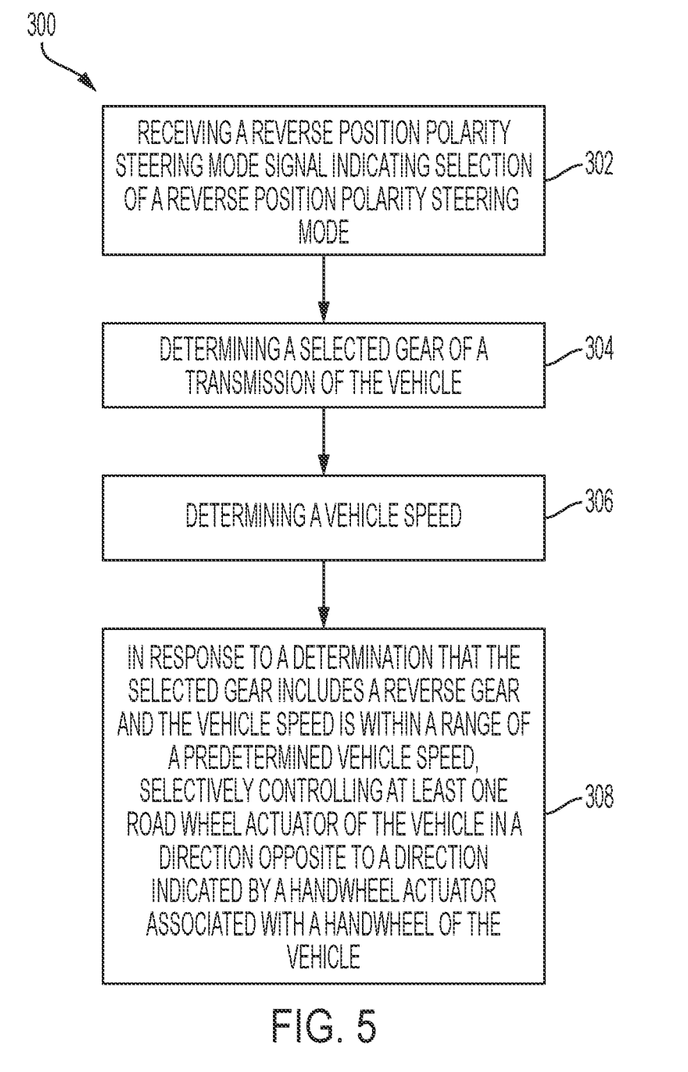
FIG. 5 is a flow diagram generally illustrating a reverse position polarity steering method according to the principles of the present disclosure.

FIG. 5 is a flow diagram generally illustrating a reverse position polarity steering method 300 according to the principles of the present disclosure. At 302, the method 300 receives a reverse position polarity steering mode signal indicating selection of a reverse position polarity steering mode. For example, the controller 100 may receive the reverse position polarity steering mode signal indicating selection of the reverse position polarity steering mode.

At 304, the method 300 determines a selected gear of a transmission of the vehicle. For example, the controller 100 may determine the selected gear of the transmission of the vehicle 10.

At 306, the method 300 determines a vehicle speed. For example, the controller 100 may determine the vehicle speed of the vehicle 10.

At 308, the method 300, in response to a determination that the selected gear includes a reverse gear and the vehicle speed is within a range of a predetermined vehicle speed, selectively controls at least one roadwheel actuator of the vehicle in a direction opposite to a direction indicated by a handwheel actuator associated with a handwheel of the vehicle. For example, the controller 100 may, in response to a determination that the selected gear includes a reverse gear and the vehicle speed is within a range of a predetermined vehicle speed, selectively control the at least one roadwheel actuator of the vehicle 10 in a direction opposite to a direction indicated by a handwheel actuator associated with the handwheel 40 of the vehicle 10.

In some embodiments, a method for providing reverse directional polarity steering in a vehicle includes, in response to receiving a reverse position polarity steering mode signal indicating selection of a reverse position polarity steering mode: determining a selected gear of a transmission of the vehicle; determining a vehicle speed; and, in response to a determination that the selected gear includes a reverse gear and the vehicle speed is within a range of a predetermined vehicle speed, selectively controlling at least one roadwheel actuator of the vehicle in a direction opposite to a direction indicated by a handwheel actuator associated with a handwheel of the vehicle.

In some embodiments, the handwheel actuator and the roadwheel actuator correspond to a steering system of the vehicle. In some embodiments, the steering system includes a steer-by-wire steering system. In some embodiments, the method includes, in response to a determination that the selected gear is not the reverse gear, disengaging the reverse position polarity steering mode and selectively controlling the at least one roadwheel actuator of the vehicle in a direction corresponding to the direction indicated by the handwheel actuator associated with the handwheel of the vehicle. In some embodiments, the method includes, in response to a determination that the vehicle speed is outside of the range of the predetermined vehicle speed, disengaging the reverse position polarity steering mode and selectively controlling the at least one roadwheel actuator of the vehicle in a direction corresponding to the direction indicated by the handwheel actuator associated with the handwheel of the vehicle. In some embodiments, the predetermined vehicle speed corresponds to the vehicle being stopped.

In some embodiments, a system for providing reverse directional polarity steering in a vehicle includes a processor and a memory. The memory includes instructions that, when executed by the processor, cause the processor to, in response to receiving a reverse position polarity steering mode signal indicating selection of a reverse position polarity steering mode: determine a selected gear of a transmission of the vehicle; determine a vehicle speed; and, in response to a determination that the selected gear includes a reverse gear and the vehicle speed is within a range of a predetermined vehicle speed, selectively control at least one roadwheel actuator of the vehicle in a direction opposite to a direction indicated by a handwheel actuator associated with a handwheel of the vehicle.

In some embodiments, the handwheel actuator and the roadwheel actuator correspond to a steering system of the vehicle. In some embodiments, the steering system includes a steer-by-wire steering system. In some embodiments, the instructions further cause the processor to, in response to a determination that the selected gear is not the reverse gear, disengage the reverse position polarity steering mode and selectively control the at least one roadwheel actuator of the vehicle in a direction corresponding to the direction indicated by the handwheel actuator associated with the handwheel of the vehicle. In some embodiments, the instructions further cause the processor to, in response to a determination that the vehicle speed is outside of the range of the predetermined vehicle speed, disengage the reverse position polarity steering mode and selectively control the at least one roadwheel actuator of the vehicle in a direction corresponding to the direction indicated by the handwheel actuator associated with the handwheel of the vehicle. In some embodiments, the predetermined vehicle speed corresponds to the vehicle being stopped.

In some embodiments, an apparatus for providing reverse directional polarity steering in a vehicle includes a processor and a memory. The memory includes instructions that, when executed by the processor, cause the a processor to: in response to receiving a reverse position polarity steering mode signal indicating selection of a reverse position polarity steering mode: determine a selected gear of a transmission of the vehicle; determine a vehicle speed; in response to a determination that the selected gear includes a reverse gear and the vehicle speed is within a range of a predetermined vehicle speed, selectively control at least one roadwheel actuator of the vehicle in a direction opposite to a direction indicated by a handwheel actuator associated with a handwheel of the vehicle; in response to a determination that the selected gear is not the reverse gear: disengage the reverse position polarity steering mode; and selectively control the at least one roadwheel actuator of the vehicle in a direction corresponding to the direction indicated by the handwheel actuator associated with the handwheel of the vehicle; and, in response to a determination that the vehicle speed is outside of the range of the predetermined vehicle speed: disengage the reverse position polarity steering mode; and selectively control the at least one roadwheel actuator of the vehicle in a direction corresponding to the direction indicated by the handwheel actuator associated with the handwheel of the vehicle.

In some embodiments, the handwheel actuator and the roadwheel actuator correspond to a steering system of the vehicle. In some embodiments, the steering system includes a steer-by-wire steering system. In some embodiments, the predetermined vehicle speed corresponds to the vehicle being stopped. In some embodiments, the instructions further cause the processor to receive a signal indicating that the reverse position polarity steering mode is not selected. In some embodiments, the instructions further cause the processor to, in response to receiving the signal indicating that the reverse position polarity steering mode is not selected, selectively control the at least one roadwheel actuator of the vehicle in a direction corresponding to the direction indicated by the handwheel actuator associated with the handwheel of the vehicle.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for providing reverse directional polarity steering in a vehicle, the method comprising:
   in response to receiving a reverse position polarity steering mode signal indicating selection of a reverse position polarity steering mode:
   determining a selected gear of a transmission of the vehicle;
   determining a first vehicle speed;
   determining a handwheel torque;
   in response to a determination that the selected gear includes a reverse gear, the first vehicle speed is within a range of a predetermined vehicle speed, and the handwheel torque is within a range of a predetermined torque, selectively controlling at least one roadwheel actuator of the vehicle in a direction opposite to a direction indicated by a handwheel actuator associated with a handwheel of the vehicle; and
   in response to a second vehicle speed being less than a lower limit of the range of the predetermined vehicle speed, selectively controlling the at least one roadwheel actuator of the vehicle in a direction corresponding to the direction indicated by the handwheel actuator associated with the handwheel of the vehicle.

2. The method of claim 1, wherein the handwheel actuator and the roadwheel actuator correspond to a steering system of the vehicle.

3. The method of claim 2, wherein the steering system includes a steer-by-wire steering system.

4. The method of claim 1, further comprising, in response to a determination that the selected gear is not the reverse gear, disengaging the reverse position polarity steering mode and selectively controlling the at least one roadwheel actuator of the vehicle in the direction corresponding to the direction indicated by the handwheel actuator associated with the handwheel of the vehicle.

5. The method of claim 1, further comprising, in response to a determination that the first vehicle speed is greater than an upper limit of the range of the predetermined vehicle speed, selectively controlling the at least one roadwheel actuator of the vehicle in the direction corresponding to the direction indicated by the handwheel actuator associated with the handwheel of the vehicle.

6. The method of claim 1, wherein the second vehicle speed corresponds to the vehicle being stopped.

7. A system for providing reverse directional polarity steering in a vehicle, the system comprising:
   a processor; and
   a memory including instructions that, when executed by the processor, cause the processor to:
   in response to receiving a reverse position polarity steering mode signal indicating selection of a reverse position polarity steering mode:
   determine a selected gear of a transmission of the vehicle;
   determine a first vehicle speed;
   determine a handwheel torque;
   in response to a determination that the selected gear includes a reverse gear, the first vehicle speed is within a range of a predetermined vehicle speed, and the handwheel torque is within a range of a predetermined torque, selectively control at least one roadwheel actuator of the vehicle in a direction opposite to a direction indicated by a handwheel actuator associated with a handwheel of the vehicle; and
   in response to a second vehicle speed being less than a lower limit of the range of the predetermined vehicle speed, selectively controlling the at least one roadwheel actuator of the vehicle in a direction corresponding to the direction indicated by the handwheel actuator associated with the handwheel of the vehicle.

8. The system of claim 7, wherein the handwheel actuator and the roadwheel actuator correspond to a steering system of the vehicle.

9. The system of claim 8, wherein the steering system includes a steer-by-wire steering system.

10. The system of claim 7, wherein the instructions further cause the processor to, in response to a determination that the selected gear is not the reverse gear, disengage the reverse position polarity steering mode.

11. The system of claim 10, wherein the instructions further cause the processor to, selectively control the at least one roadwheel actuator of the vehicle in a direction corresponding to the direction indicated by the handwheel actuator associated with the handwheel of the vehicle.

12. The system of claim 7, wherein the instructions further cause the processor to, in response to a determination that the first vehicle speed is greater than an upper limit of the range of the predetermined vehicle speed, disengage the reverse position polarity steering mode.

13. The system of claim 12, wherein the instructions further cause the processor to selectively control the at least one roadwheel actuator of the vehicle in the direction corresponding to the direction indicated by the handwheel actuator associated with the handwheel of the vehicle.

14. The system of claim 7, wherein the second vehicle speed corresponds to the vehicle being stopped.

15. An apparatus for providing reverse directional polarity steering in a vehicle, the apparatus comprising:
a processor; and
a memory including instructions that, when executed by the processor, cause the processor to:
in response to receiving a reverse position polarity steering mode signal indicating selection of a reverse position polarity steering mode:
determine a selected gear of a transmission of the vehicle;
determine a first vehicle speed;
determine a handwheel torque;
in response to a determination that the selected gear includes a reverse gear, the first vehicle speed is within a range of a predetermined vehicle speed, and the handwheel torque is within a range of a predetermined torque, selectively control at least one roadwheel actuator of the vehicle in a direction opposite to a direction indicated by a handwheel actuator associated with a handwheel of the vehicle;
in response to a second vehicle speed being less than a lower limit of the range of the predetermined vehicle speed, selectively controlling the at least one roadwheel actuator of the vehicle in a direction corresponding to the direction indicated by the handwheel actuator associated with the handwheel of the vehicle;
in response to a determination that the selected gear is not the reverse gear:
disengage the reverse position polarity steering mode; and
selectively control the at least one roadwheel actuator of the vehicle in the direction corresponding to the direction indicated by the handwheel actuator associated with the handwheel of the vehicle; and
in response to a determination that the first vehicle speed is greater than an upper limit of the range of the predetermined vehicle speed:
disengage the reverse position polarity steering mode; and
selectively control the at least one roadwheel actuator of the vehicle in the direction corresponding to the direction indicated by the handwheel actuator associated with the handwheel of the vehicle.

16. The apparatus of claim 15, wherein the handwheel actuator and the roadwheel actuator correspond to a steering system of the vehicle.

17. The apparatus of claim 16, wherein the steering system includes a steer-by-wire steering system.

18. The apparatus of claim 15, wherein the second vehicle speed corresponds to the vehicle being stopped.

19. The apparatus of claim 15, wherein the instructions further cause the processor to receive a signal indicating that the reverse position polarity steering mode is not selected.

20. The apparatus of claim 19, wherein the instructions further cause the processor to, in response to receiving the signal indicating that the reverse position polarity steering mode is not selected, selectively control the at least one roadwheel actuator of the vehicle in the direction corresponding to the direction indicated by the handwheel actuator associated with the handwheel of the vehicle.

* * * * *